United States Patent [19]

Curry

[11] Patent Number: 4,622,593
[45] Date of Patent: Nov. 11, 1986

[54] POLYGON SIGNATURE CORRECTION

[75] Inventor: Douglas N. Curry, Menlo Park, Calif.

[73] Assignee: Xerox Corporation, Stamford, Conn.

[21] Appl. No.: 614,928

[22] Filed: May 29, 1984

[51] Int. Cl.[4] .................. H04N 1/40; H04N 1/17
[52] U.S. Cl. ...................... 358/284; 358/280; 358/288; 350/484; 250/235
[58] Field of Search ............ 358/293, 294, 285, 288, 358/280, 267, 206, 256; 350/484, 486, 487, 6.7, 6.8; 250/236

[56] References Cited

U.S. PATENT DOCUMENTS

| | | | |
|---|---|---|---|
| 3,384,821 | 5/1968 | Beck | 375/119 |
| 3,848,087 | 11/1974 | Carrell | 358/264 |
| 3,867,571 | 2/1975 | Starkweather | 350/486 |
| 4,130,838 | 12/1978 | St. John | 358/267 |
| 4,204,233 | 5/1980 | Swager | 358/293 |
| 4,268,867 | 5/1981 | Traino | 358/285 |
| 4,320,420 | 3/1982 | Rider | 358/267 |
| 4,349,847 | 9/1982 | Traino | 358/293 |
| 4,369,365 | 1/1983 | Bedford et al. | 358/293 |
| 4,404,596 | 9/1983 | Jurgensen et al. | 358/293 |

OTHER PUBLICATIONS

"Correcting Method for Light Scanning Error of Rotating Polygon Mirror", IECE-Denshi Tsushin Gakkai of Japan, vol. J66, No. 2, Tadashi Matsuda et al.
"A Correction Method for Laser Scanning Errors in High Speed Laser Printers", Fujitsu Sci. and Tech., vol. 18, No. 4, pp. 579-594, Tomohisa Mikami et al.

Primary Examiner—James J. Groody
Assistant Examiner—John K. Peng
Attorney, Agent, or Firm—Robert E. Cunha

[57] ABSTRACT

A circuit for correcting the data rate to compensate for polygon facet irregularities in a flying spot scanner is described. A crystal controlled oscillator is used to generate the system clock. As each facet becomes the current facet, a number of pulses appropriate for that facet are subtracted from the bit clock stream so that there will always be a constant ratio between data speed and scan speed regardless of the scan speed variations between individual facets.

6 Claims, 4 Drawing Figures

POLYGON SIGNATURE CORRECTION

This invention is a circuit which compensates for irregularities in the facets of a polygon used in the raster output scanner of a non-impact printer or used in the raster input scanner, and more specifically is a digital circuit which electronically compensates for the varying scan speeds which result from polygon facet irregularities.

In a non-impact printer, it is typical to use a rotating polygon having a number of facets in a flying spot scanner for exposing a xerographic drum. However, there are always individual defects in the facets of the polygon such as a variation in the distance of each facet to the center of the polygon, and although these differences may be very small in terms of dimensions, the result will be a difference in scan speed from one facet to the next. In terms of copy quality, there will be a line to line variation in scan length and vertical lines (lines perpendicular to the scanning direction) will appear jagged to some extent.

In a similar manner, a raster input scanner employing a rotating polygon to displace a spot for scanning an input document will accumulate data rasters which need to be corrected. Slight variations in the polygon dimensions, such as a variation in the distance of each facet to the center of the polygon, and although these differences may be very small in terms of dimensions, the result will be a difference in scan speed from one facet to the next. In terms of accumulated data quality, there will be a line to line variation in the number of data bits collected from constant width input documents. One way to prevent this is by improving the precision of the polygon at greater cost.

It is possible to use a lower cost, and less precise, polygon, and compensate for the variation in facets through the use of a correction circuit. One possibility is described in commonly assigned U.S. Pat. Nos. 4,204,233, Electronic Facet Error Correction for Laser Scanning, by Gary E. Swager and 4,320,420, Hybrid Bit Clock Servo, by Ronald E. Rider. In these patents, the scanning speed for each facet is measured with start-of-scan and end-of-scan detectors, and digital representations of the differences between nominal and actual scan speeds are stored in memory. Then, for each facet, a digital to analog converter is used to generate from the digital representation an analog correction voltage which is added to the input voltage of a voltage controlled oscillator which generates the data clock pulses. In this way, the clock rate is different for each facet, thereby compensating for the variation in facet scanning speeds.

An alternative is to use an all-digital circuit to effect this correction. A digital circuit, controlled by a crystal oscillator, would be more reliable and less variable, but the frequency of a crystal controlled oscillator cannot be adjusted. The inventor in this case has overcome this limitation by using a crystal oscillator to generate a stream of high frequency clock pulses, called "sample clocks", and by occasionally removing a sample clock pulse to vary the apparent frequency at the clock output. During the scan of each facet, removing more sample clock pulses lowers the effective frequency, removing fewer raises it. The removal of pulses is spread over the entire scan, and the frequency is counted down by a significant factor before being used by the data input or output circuit, the result being an unnoticeable local variation of space width during scanning.

A faster spot velocity requires a higher frequency bit clock, and a lower spot velocity requires a lower frequency bit clock. In general, proper correction requires that the bit clock be proportional to the spot scanning velocity.

Since facet-to-facet differences in scan speeds are a function of the facet dimensions, there will be no variation in the set of correction values during use. Thus, when the system is first turned on, or at any other time which is appropriate, a calibration procedure can be accomplished automatically under microprocessor control. When input or output scanning takes place, the facet differences will be compensated for. In this way, a lower cost polygon can be used to print high quality copies or scan input documents.

This invention will be more readily understood in terms of the following figures.

DETAILED DESCRIPTION OF THE DRAWINGS

Figure 1:
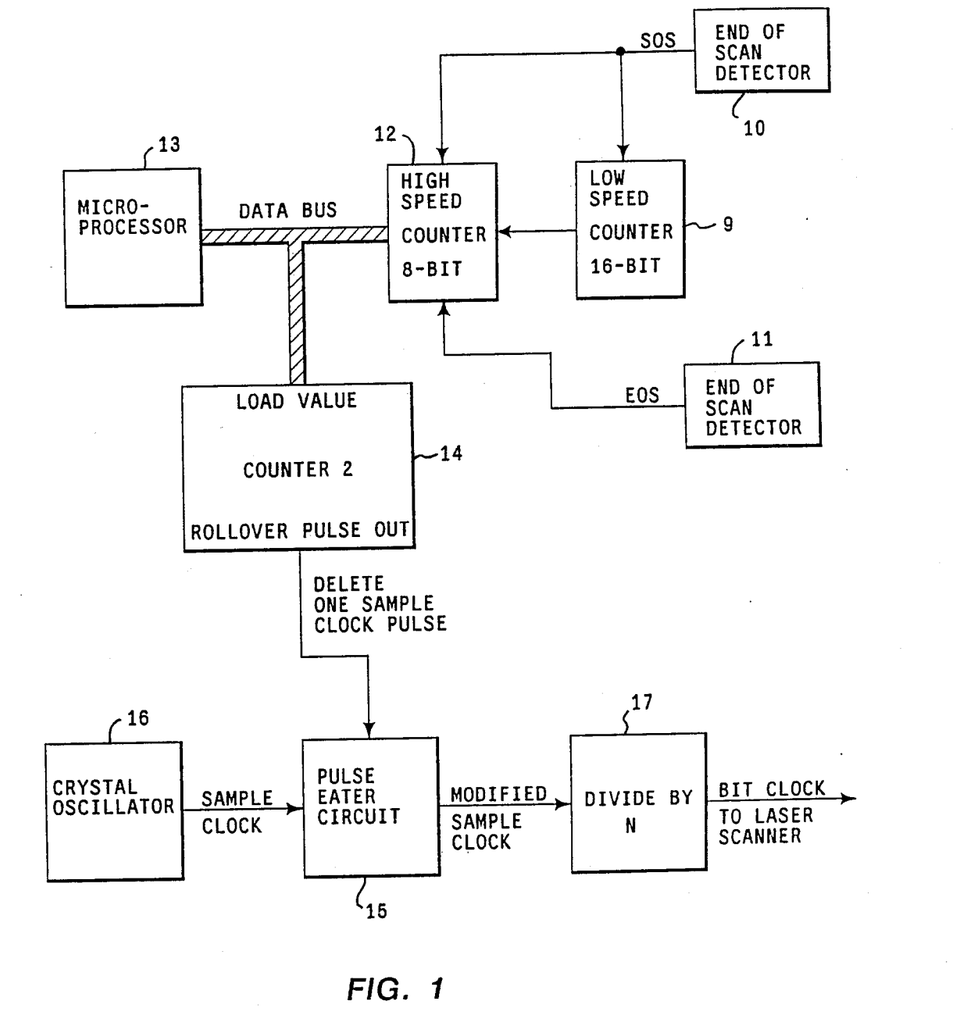
FIG. 1 is a simplified block diagram.

The portion of the circuit to be described first is used to calibrate the system. In FIG. 1, start of scan detector 10 and end of scan detector 11 control counters 9 and 12 to count the number of clock pulses that occur during each facet scan. The lower speed 16 bit counter 9 is used to accurately count most of the scan. Just before the end of scan pulse is expected, the counter 9 issues an overflow pulse, which reloads and stops itself and also starts the high speed, 8-bit counter 12. At the end of scan pulse, the high speed counter is stopped and its contents are available to the microprocessor 13 as a digital representation of the scan speed.

A better way to achieve the same results would be to eliminate counter 9 altogether and allow counter 12 to count the entire period from start-of-scan to end-of-scan. The high speed 8-bit counter 12 would "roll over" many times during this period, but since only differences between scans are being measured, it is not necessary to know how many times the counter rolls over. As long as the difference in scan speed between any two scans remains less than half of 256, the contents of the counter is unambiguous.

To maintain high accuracy, the system measures and accumulates the scan speed for R polygon revolutions for each facet, divides each accumulated value by R, and uses these averages as the digital representations of the scan speed of the facets. At the end of this calibration procedure, the microprocessor 13 has stored a digital representation of the scan speed for each facet.

The next step is for the microprocessor to calculate correction numbers for each facet. A system which removes pulses from a stream of sample clock pulses lowers the sample clock pulse rate and therefore the data rate at which data is fed to the scanner. Therefore, it would be most efficient for the system to use the fastest scan (requiring the highest data rate) as the standard, and correct the data rates of the other scans to it (by slowing those data rates down). To this end, the microprocessor calculates the differences (in sample clocks) between the fastest scan and all other scans, to produce a set of numbers. Finally, the number of sample clocks per scan is divided by this set of numbers to produce a set of correction numbers which will be used by the circuit. To illustrate by way of a numerical example, let us assume that the fastest scan is three sample clock pulses faster than the one to be corrected. Then, the number of sample clocks per scan (assumes 12,000 from SOS to EOS) could be divided by three, giving a correction number of 4,000. Then one clock pulse in every four thousand is deleted from the scan to be corrected. The result is that the data for the slow scan is supplied at a slower rate, maintaining a proportionality between spot velocity and data rate.

A better correction method would be to divide the number of sample clocks per scan by one more than the scan pulse difference, so that the correction pulses would be spaced more evenly throughout the scan. To use the above example, if the scan to be corrected is three pulses too slow, the number of sample clocks per scan, (12,000) would be divided by four. Then the correction pulses will occur at points in the line corresponding to sample clock numbers 3,000, 6,000 and 9,000.

An alternative is for the microprocessor to use a table look-up to generate the correction number. This would be needed if the microprocessor was unable to directly calculate the needed correction value in the time from end-of-scan of one raster to the start-of-scan of the next raster. The numbers could be pre-calculated and stored in memory.

In FIG. 1, the microprocessor 13 loads this correction number into counter 14, which produces a pulse for each correction number of input pulses. The pulse eater circuit 15 deletes one sample clock pulse from the stream of sample clock pulses received from the sample clock generator 16 for each correction pulse received from the counter 14, and outputs the modified sample clock pulses to a divider circuit 17 which, in turn, outputs the final bit clock which is used to clock out the actual data to the raster output scanner or raster input scanner.

Figure 2:
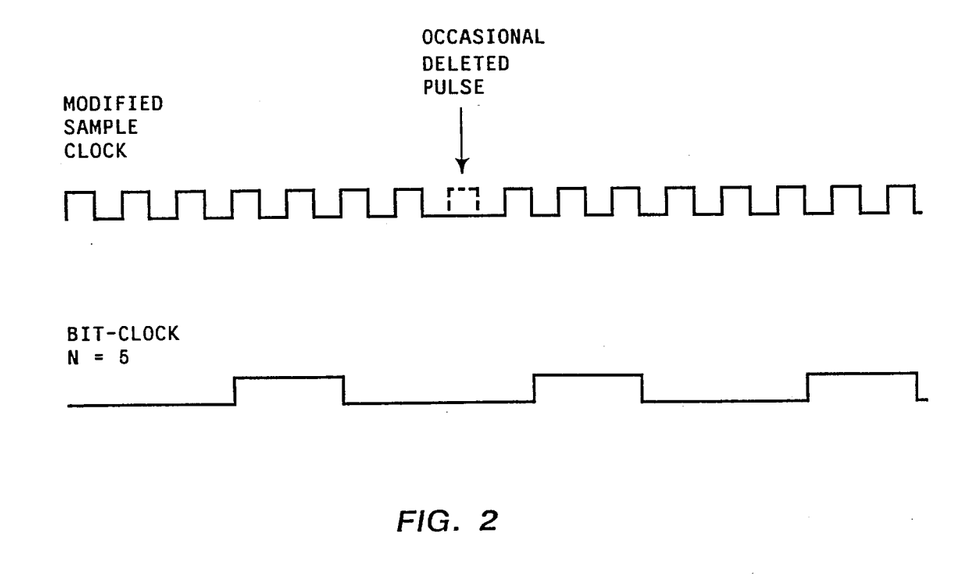
FIG. 2 is a diagram of typical waveshapes.
Figure 3A:
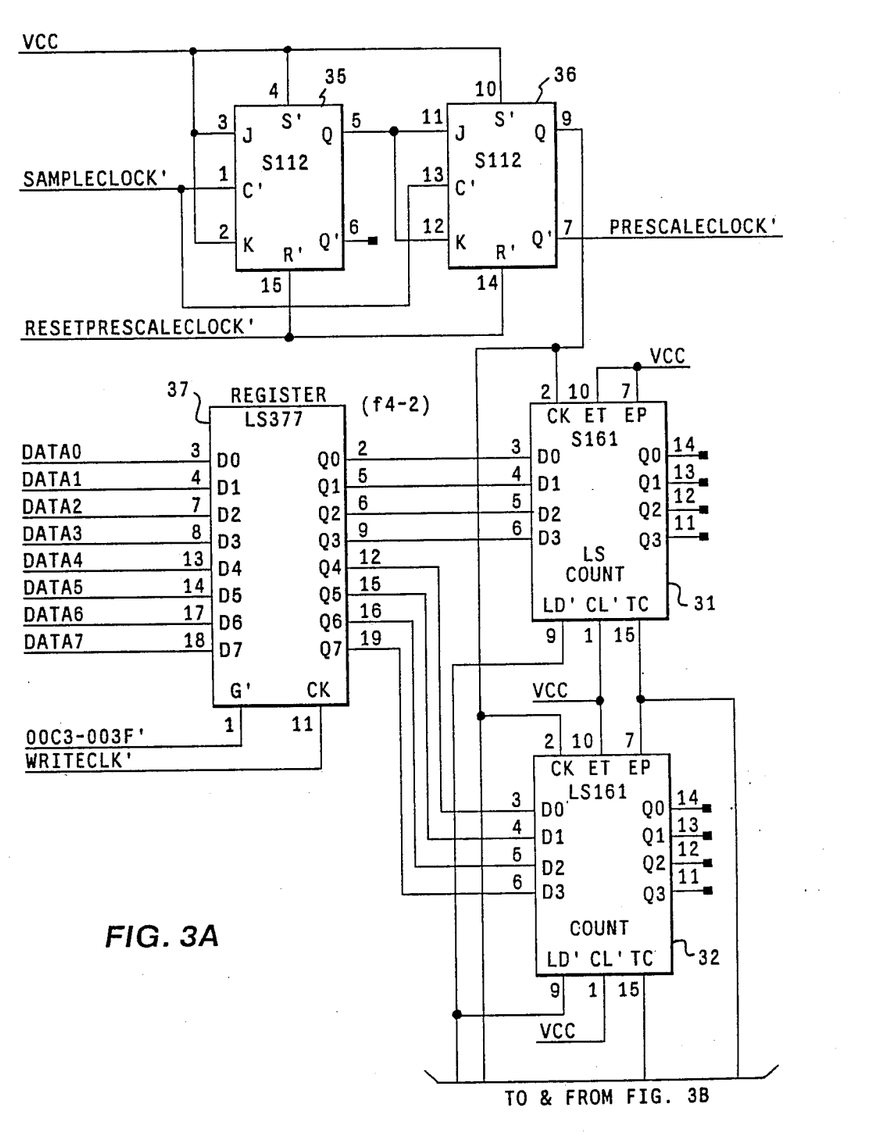
FIGS. 3 and 4 are a schematic diagram of the circuit.
Figure 3B:
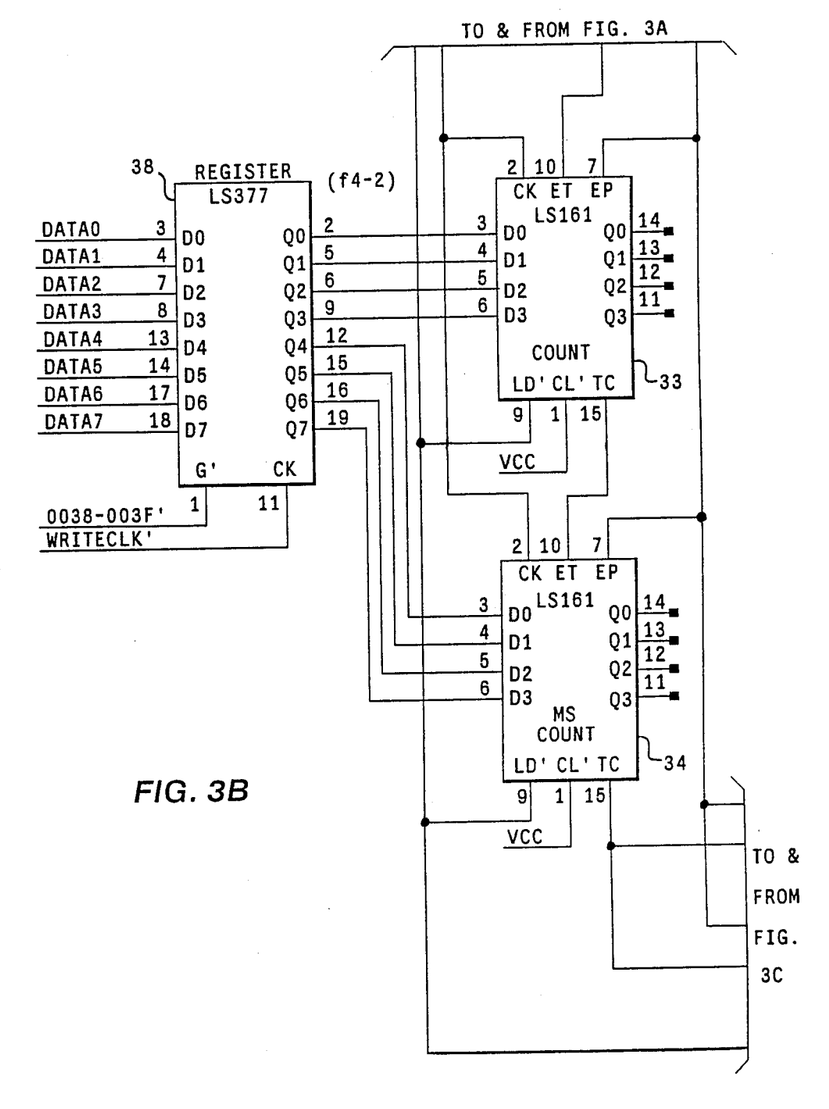
Figure 3C:
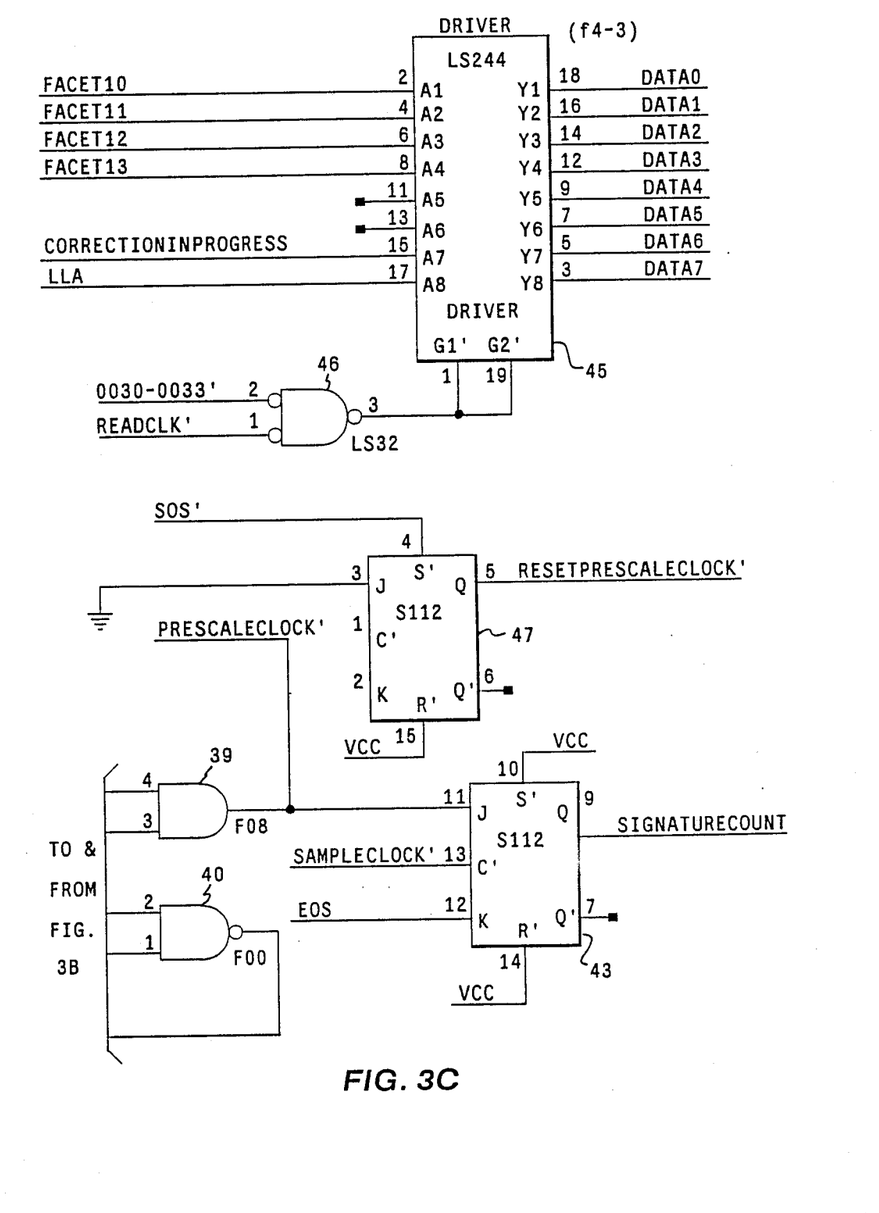
Figure 3D:
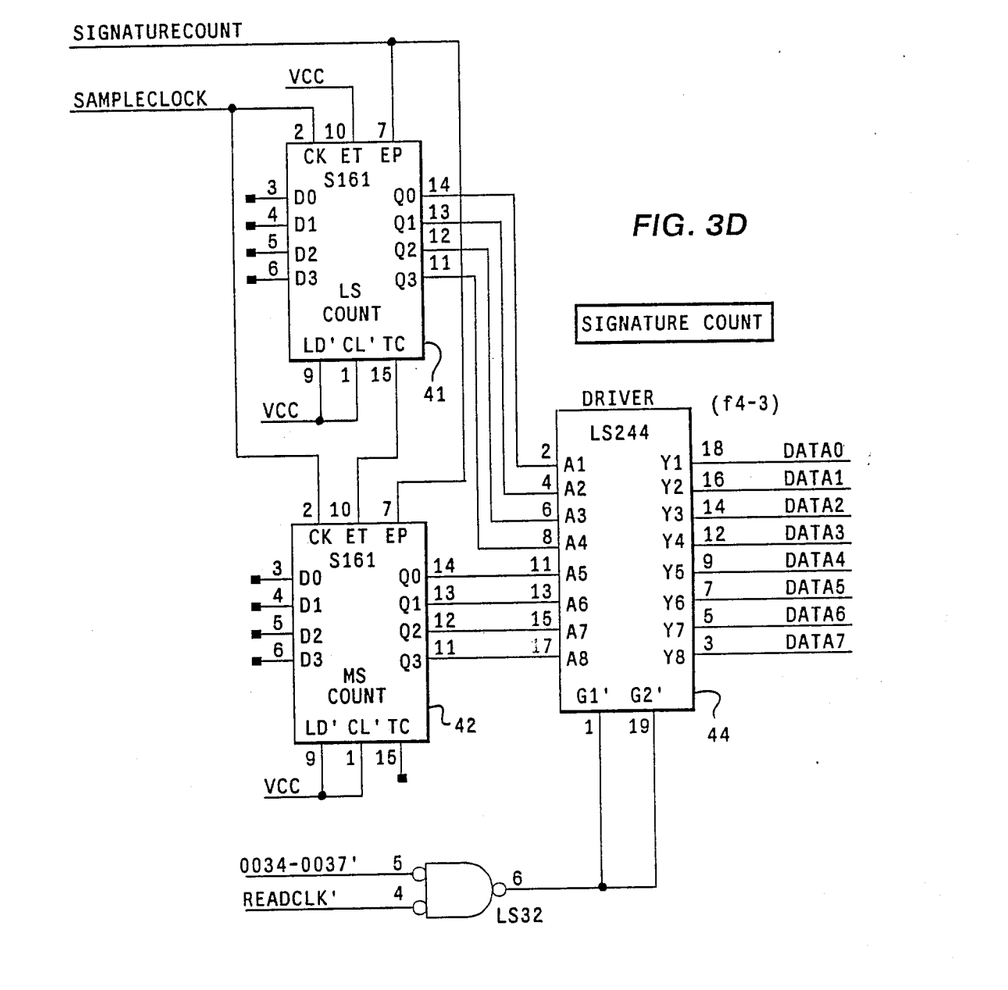

The corresponding waveshapes are shown in FIG. 2. The modified sample clock shows a stream of sample clocks with one deleted. After the divide by N circuit (N=5), the bit clock is shown. This bit clock waveshape is slightly elongated at the point where the sample clock was deleted.

FIG. 3 is a schematic of the circuit used to calibrate the system. The first step is to count the number of sample clock pulses that occur during a scan. Counter 41, 42 is used for this. However, to reduce the number of sample clocks that must be counted, first the sample clock frequency is reduced by a factor of four, and second a constant number of pulses is subtracted off prior to the start of counting. The frequency reduction is accomplished at divider 35, 36 where the 44 MHz SampleClock' signal is reduced to 11 MHz. To subtract off a constant number of pulses from the count, a constant is supplied from the microprocessor on the data lines Data0 through Data7 through register 37, 38 and is loaded into counter 31-34. The supplied number is actually generated by subtracting it from FFFF (hex), so that when the result is loaded into the counter 31-34, and clock pulses are used to count up, there will be an overflow output pulse at the appropriate number. This number is initially predetermined so that the overflow pulse will occur about 128 sample clock pulses before the end of the scan.

This overflow pulse is applied through gate 40 to reset the counter 31-34 and is also applied through gate 39 to turn off flip-flop 47 and turn on flip-flop 43. Reset-PreScaleClock is taken from flip-flop 47 and is used to shut off the divider 35, 36 which turns off counter 31-34. SignatureCount from flip-flop 43 enables counter 41, 42 to begin counting sample clock pulses.

At the time of the actual end of scan, signal EOS will be applied to flip-flop 43 which will terminate the counting at counter 41, 42. The counter will not contain a number in the area of 128 but will contain a variation which is a function of the difference between the nominal and actual scan speed. This number is transmitted to the microprocessor through register 44.

Between scans both counters are off. At the beginning of the next scan, signal SOS switches on flip-flop 47, enabling the divider circuit, and therefore counter 31-34. This completes one scan measurement cycle.

A facet counter, not shown, counts start of scan pulses to generate a facet number for each of the facets, and this number is coupled to the microprocessor through register 45. The system will continue to send facet counts to the processor until each facet has been measured 256 times.

In fact, each facet count will have a variation from nominal consisting of two components, the facet signature variation and any variation in motor velocity. However, motor velocity variations tend to affect all facets equally. Therefore, when differences between facets are generated, the motor velocity factor will be subtracted out.

Figure 4A:
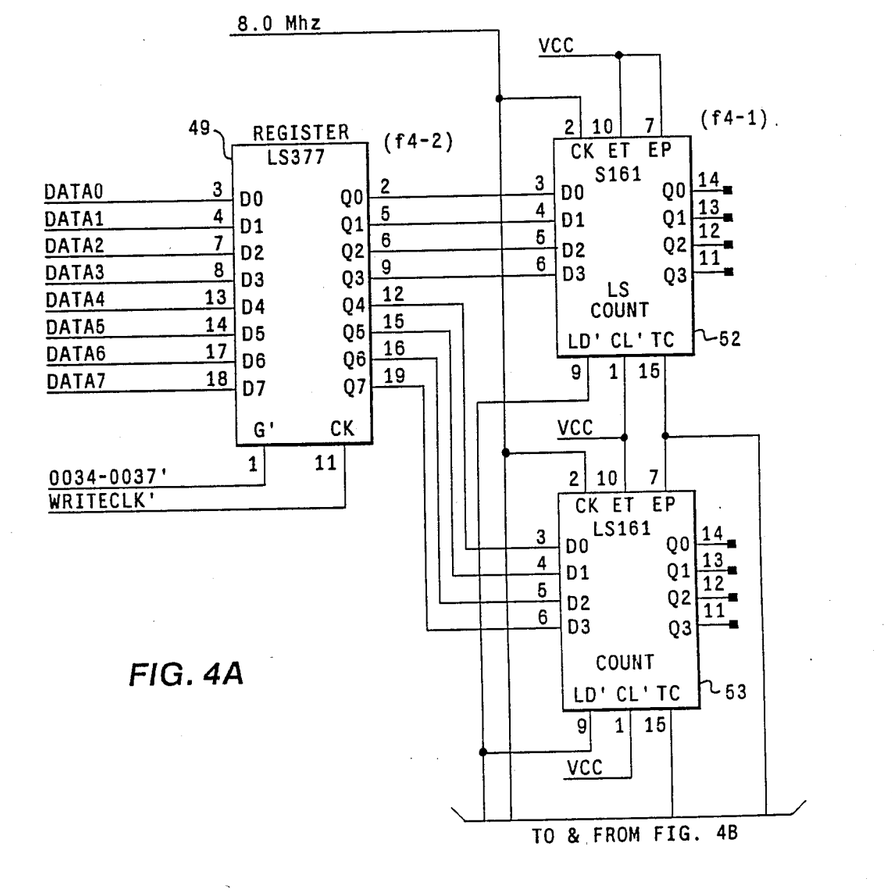
Figure 4B:
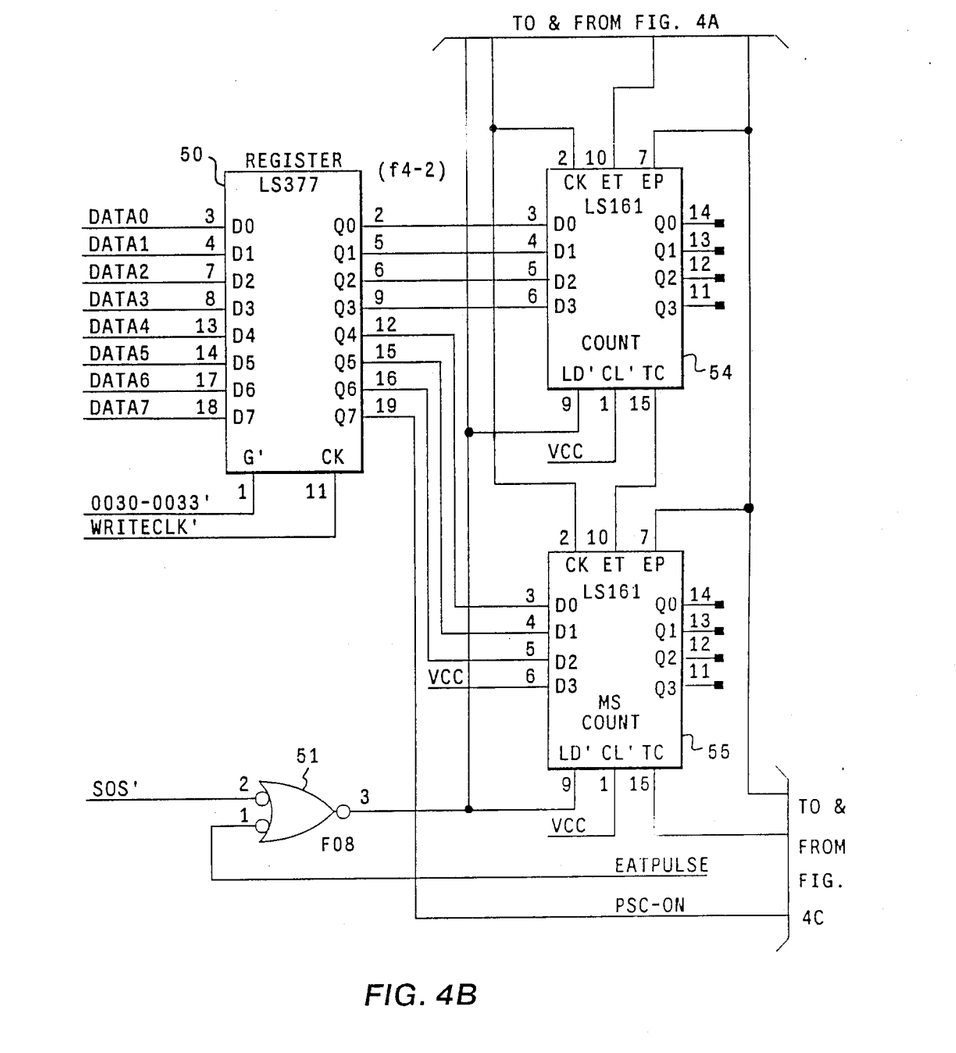
Figure 4C:
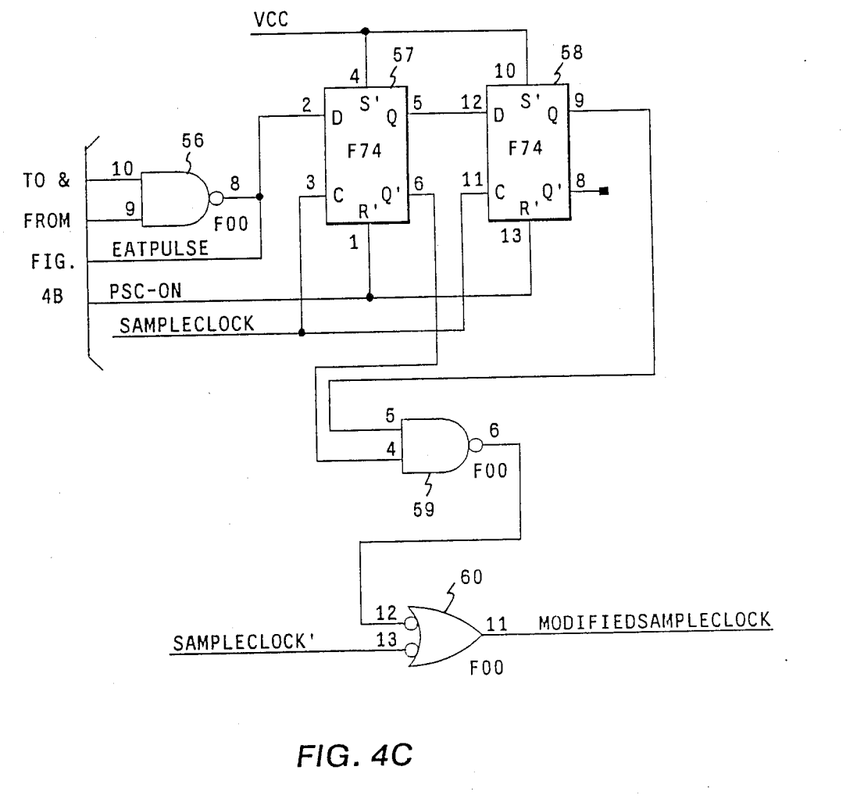

The calibration phase ends with the microprocessor having a correction number for each facet. In use, the circuit of FIG. 4 uses this number for the correction of each facet by first loading this correction number through register 49, 50 into counter 52-55. The counter is clocked with an 8 MHz clock and the periodic overflow pulses are coupled through gates 56 and 51 to reload the counter 52-55 and also coupled through gate 56 to the pulse eater comprising flip-flops 57 and 58 and gates 59 and 60. The pulse eater receives a continuous stream of sample clock pulses, and deletes one for each overflow pulse received from the counter 52-55. The output of gate 60 is the modified sample clock which is later divided by N and becomes the bit clock for the raster scanner.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

I claim:

1. In a raster output scanning system of the type having a motor driving a rotating polygon, means for measuring the scan speed of each facet, and means responsive to each facet scan speed measurement for varying the bit clock during succeeding scans to compensate for each facet speed variation to produce lines of data of equal length independent of individual facet scan speed, or in a raster input scanning system of the type having a motor driving a rotation polygon, means for measuring the scan speed of each facet, and means responsive to each facet scan speed measurement for varying the bit clock during succeeding scans to compensate for the speed variation to acquire proper numbers of data bits independent of individual scan speed, the improvement comprising:
- a sample clock generator,
- means for calculating from the measurement for the current facet the number of sample clocks which must be removed from the stream of sample clocks, which determine the rate at which data is fed to the raster output or input scanner, to match the data rate to the current facet scan speed,
- means for deleting an evenly spaced number of sample clocks, equal to the calculated number, from the stream of sample clocks to create a corrected bit clock.

2. The system of claim 1 wherein the means for calculating also calculates the spacing of the sample clock deletions, the spacing being a correction number specifying the number of sample clocks between deleted sample clocks, and wherein the means for deleting comprises a counter for generating a correction pulse at the end of each specified number of sample clocks, and a pulse eater circuit which receives the stream of sample clocks and deletes one sample clock for each correction pulse it receives.

3. The system of claim 1 wherein the sample clock generator is crystal controlled.

4. In a raster output scanning system of the type having a motor driving a rotating polygon, means for measuring the scan speed of each facet, and means responsive to each facet scan speed measurement for varying the bit clock during succeeding scans to compensate for each facet speed variation to produce lines of data of equal length independent of individual facet scan speed, or in a raster input scanning system of the type having a motor driving a rotation polygon, means for measuring the scan speed of each facet, and means responsive to each facet scan speed measurement for varying the bit clock during succeeding scans to compensate for the speed variation to acquire proper numbers of data bits independent of individual scan speed, the improvement comprising:
- a sample clock generator,
- means for calculating from the measurement for the current facet the number of sample clocks which must be removed from the stream of sample clocks, which determine the rate at which data is fed to the raster output or input scanner, to match the data rate to the current facet scan speed,
- means for deleting an evenly spaced number of sample clocks equal to the calculated number, from the stream of sample clocks to create a corrected bit clock,
- wherein said sample clocks are generated at a frequency N times greater than that required to deliver data to the raster scanner, and
- wherein the circuit further comprises a divide by N circuit for reducing the frequency of the sample clocks at the output of the means for deleting to reduce the effect of the deletions on the bit clock waveshape.

5. The system of claim 4 wherein said means for measuring scan speed comprises a start-of-scan detector and an end-of-scan detector, both of which produce a pulse output, and a counter for counting clocks occurring between the start and end of scan.

6. The system of claim 4 wherein said scan speeds are measured by accumulating many measurements and averaging the results.

* * * * *